US009354689B2

(12) United States Patent
Bhandaru et al.

(10) Patent No.: US 9,354,689 B2
(45) Date of Patent: May 31, 2016

(54) PROVIDING ENERGY EFFICIENT TURBO OPERATION OF A PROCESSOR

(75) Inventors: Malini K. Bhandaru, Sudbury, MA (US); Eric J. Dehaemer, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 312 days.

(21) Appl. No.: 13/997,288

(22) PCT Filed: Mar. 13, 2012

(86) PCT No.: PCT/US2012/028865

§ 371 (c)(1), (2), (4) Date: Jun. 24, 2013

(87) PCT Pub. No.: WO2013/137859

PCT Pub. Date: Sep. 19, 2013

(65) Prior Publication Data

US 2013/0346774 A1 Dec. 26, 2013

(51) Int. Cl.
*G06F 1/32* (2006.01)

(52) U.S. Cl.
CPC .............. *G06F 1/3234* (2013.01); *G06F 1/324* (2013.01); *Y02B 60/1217* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | | |
|---|---|---|---|
| 5,163,153 | A | 11/1992 | Cole et al. |
| 5,522,087 | A | 5/1996 | Hsiang |
| 5,590,341 | A | 12/1996 | Matter |
| 5,621,250 | A | 4/1997 | Kim |
| 5,931,950 | A | 8/1999 | Hsu |
| 6,748,546 | B1 | 6/2004 | Mirov et al. |
| 6,792,392 | B1 | 9/2004 | Knight |
| 6,823,516 | B1 | 11/2004 | Cooper |
| 6,829,713 | B2 | 12/2004 | Cooper et al. |
| 6,996,728 | B2 | 2/2006 | Singh |
| 7,010,708 | B2 | 3/2006 | Ma |

(Continued)

FOREIGN PATENT DOCUMENTS

EP 1 282 030 A1 5/2003

OTHER PUBLICATIONS

U.S. Patent and Trademark Office, Office Action mailed Aug. 5, 2014 in U.S. Appl. No. 13/600,568, with Reply to Office Action filed on Oct. 29, 2014.

(Continued)

*Primary Examiner* — Zahid Choudhury
(74) *Attorney, Agent, or Firm* — Trop, Pruner & Hu, P.C.

(57) ABSTRACT

In one embodiment, a multicore processor includes cores that can independently execute instructions, each at an independent voltage and frequency. The processor may include a power controller having logic to prevent a first core from execution at a requested turbo mode frequency if the first core has a stall rate greater than a first stall threshold, and concurrently allow a second core to execute at a requested turbo mode frequency if the second core has a stall rate less than a second stall threshold. Other embodiments are described and claimed.

17 Claims, 8 Drawing Sheets

(56) References Cited

U.S. PATENT DOCUMENTS

| | | | | |
|---|---|---|---|---|
| 7,043,649 | B2 | 5/2006 | Terrell | |
| 7,093,147 | B2 | 8/2006 | Farkas et al. | |
| 7,111,179 | B1 | 9/2006 | Girson et al. | |
| 7,194,643 | B2 | 3/2007 | Gonzalez et al. | |
| 7,272,730 | B1 | 9/2007 | Acquaviva et al. | |
| 7,412,611 | B2 | 8/2008 | Tipley | |
| 7,412,615 | B2 | 8/2008 | Yokota et al. | |
| 7,434,073 | B2 | 10/2008 | Magklis | |
| 7,437,270 | B2 | 10/2008 | Song et al. | |
| 7,454,632 | B2 | 11/2008 | Kardach et al. | |
| 7,529,956 | B2 | 5/2009 | Stufflebeam | |
| 7,539,885 | B2 | 5/2009 | Ma | |
| 7,596,705 | B2 | 9/2009 | Kim | |
| 7,730,340 | B2 | 6/2010 | Hu et al. | |
| 8,429,441 | B2 | 4/2013 | Baker et al. | |
| 8,438,359 | B2 | 5/2013 | Kasahara et al. | |
| 8,463,973 | B2 | 6/2013 | Naffziger et al. | |
| 8,560,869 | B2 | 10/2013 | Allarey | |
| 2001/0044909 | A1 | 11/2001 | Oh et al. | |
| 2002/0194509 | A1 | 12/2002 | Plante et al. | |
| 2003/0061383 | A1 | 3/2003 | Zilka | |
| 2004/0025069 | A1 | 2/2004 | Gary et al. | |
| 2004/0064752 | A1 | 4/2004 | Kazachinsky et al. | |
| 2004/0098560 | A1 | 5/2004 | Storvik et al. | |
| 2004/0139356 | A1 | 7/2004 | Ma | |
| 2004/0268166 | A1 | 12/2004 | Farkas et al. | |
| 2005/0022038 | A1 | 1/2005 | Kaushik et al. | |
| 2005/0033881 | A1 | 2/2005 | Yao | |
| 2005/0132238 | A1 | 6/2005 | Nanja | |
| 2006/0050670 | A1 | 3/2006 | Hillyard et al. | |
| 2006/0053326 | A1 | 3/2006 | Naveh | |
| 2006/0059286 | A1 | 3/2006 | Bertone et al. | |
| 2006/0069936 | A1 | 3/2006 | Lint et al. | |
| 2006/0117202 | A1 | 6/2006 | Magklis et al. | |
| 2006/0184287 | A1 | 8/2006 | Belady et al. | |
| 2007/0005995 | A1 | 1/2007 | Kardach et al. | |
| 2007/0016817 | A1 | 1/2007 | Albonesi et al. | |
| 2007/0033425 | A1 * | 2/2007 | Clark | 713/320 |
| 2007/0079294 | A1 | 4/2007 | Knight | |
| 2007/0106827 | A1 | 5/2007 | Boatright et al. | |
| 2007/0156992 | A1 | 7/2007 | Jahagirdar | |
| 2007/0214342 | A1 | 9/2007 | Newburn | |
| 2007/0239398 | A1 | 10/2007 | Song et al. | |
| 2007/0245163 | A1 | 10/2007 | Lu et al. | |
| 2008/0005592 | A1 | 1/2008 | Allarey et al. | |
| 2008/0028240 | A1 | 1/2008 | Arai et al. | |
| 2008/0162972 | A1 | 7/2008 | Liu et al. | |
| 2008/0250260 | A1 | 10/2008 | Tomita | |
| 2009/0006871 | A1 * | 1/2009 | Liu et al. | 713/300 |
| 2009/0150695 | A1 | 6/2009 | Song et al. | |
| 2009/0150696 | A1 | 6/2009 | Song et al. | |
| 2009/0158061 | A1 | 6/2009 | Schmitz et al. | |
| 2009/0158067 | A1 | 6/2009 | Bodas et al. | |
| 2009/0172375 | A1 | 7/2009 | Rotem et al. | |
| 2009/0172428 | A1 | 7/2009 | Lee | |
| 2009/0235105 | A1 | 9/2009 | Branover et al. | |
| 2010/0064162 | A1 | 3/2010 | Rotem et al. | |
| 2010/0115304 | A1 | 5/2010 | Finkelstein et al. | |
| 2010/0115309 | A1 | 5/2010 | Carvalho et al. | |
| 2010/0138675 | A1 | 6/2010 | Nikazm et al. | |
| 2010/0146513 | A1 | 6/2010 | Song | |
| 2010/0191997 | A1 | 7/2010 | Dodeja et al. | |
| 2011/0138388 | A1 | 6/2011 | Wells et al. | |
| 2011/0154090 | A1 | 6/2011 | Dixon et al. | |
| 2011/0161683 | A1 | 6/2011 | Zou et al. | |
| 2011/0258477 | A1 | 10/2011 | Baker et al. | |
| 2012/0054515 | A1 | 3/2012 | Naffziger et al. | |
| 2012/0072750 | A1 | 3/2012 | Jahagirdar et al. | |
| 2012/0079290 | A1 | 3/2012 | Kumar | |
| 2012/0246506 | A1 | 9/2012 | Knight | |
| 2013/0061064 | A1 | 3/2013 | Ananthakrishnan et al. | |
| 2013/0080803 | A1 | 3/2013 | Ananthakrishnan et al. | |
| 2013/0080804 | A1 | 3/2013 | Ananthakrishnan et al. | |
| 2013/0111120 | A1 | 5/2013 | Ananthakrishnan et al. | |
| 2013/0111121 | A1 | 5/2013 | Ananthakrishnan et al. | |
| 2013/0111226 | A1 | 5/2013 | Ananthakrishnan et al. | |
| 2013/0111236 | A1 | 5/2013 | Ananthakrishnan et al. | |
| 2014/0068284 | A1 | 3/2014 | Bhandru et al. | |
| 2014/0068290 | A1 | 3/2014 | Bhandaru et al. | |
| 2014/0195829 | A1 | 7/2014 | Bhandaru et al. | |
| 2014/0208141 | A1 | 7/2014 | Bhandaru et al. | |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

International Searching Authority, "Notification of Transmittal of the International Search Report and the Written Opinion of the International Searching Authority," mailed Nov. 28, 2012, in International application No. PCT/US2012/028865.

U.S. Patent and Trademark Office, Reply to Office Action filed Sep. 22, 2015 in U.S. Appl. No. 13/997,757.

Microsoft Press Publisher, Microsoft Computer Dictionary, Microsoft Press, Mar. 15, 2002, ISBN-13: 978-0-7356-1495-6; ISBN 10: 0-7356-1495-4, pp. 1-8.

U.S. Patent and Trademark Office, Office Action mailed Jun. 10, 2015 and Reply filed Sep. 10, 2015, in U.S. Appl. No. 13/997,386.

U.S. Patent and Trademark Office, Office Action mailed Jun. 23, 2015, in U.S. Appl. No. 13/997,757.

* cited by examiner

PROVIDING ENERGY EFFICIENT TURBO OPERATION OF A PROCESSOR

TECHNICAL FIELD

Embodiments relate to power management of an integrated circuit.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

Power and thermal management issues are considerations in all segments of computer-based systems. While in the server domain, the cost of electricity drives the need for low power systems, in mobile systems battery life and thermal limitations make these issues relevant. Optimizing a system for maximum performance at minimum power consumption is usually done using the operating system (OS) or system software to control hardware elements. Most modern OS's use the Advanced Configuration and Power Interface (ACPI) standard (e.g., Rev. 3.0b, published Oct. 10, 2006) for optimizing the system in these areas.

An ACPI implementation allows a processor core to be in different power-saving states (also termed low power or idle states), generally referred to as so-called C1 to Cn states. In addition to power-saving states, performance states or so-called P-states are also provided in ACPI. These performance states may allow control of performance-power levels while a core is in an active state (C0). In general, multiple P-states may be available, from P0-PN. There can be a range of higher frequency/performance states that are generally referred to as turbo mode.

Some processors expose a large turbo range. When cores seek to turbo, typically they all are granted the maximum possible turbo frequency. Not all applications can effectively use increased core frequency to the same extent for a variety of reasons. Such differences arise either from the memory access patterns of the individual applications or due to shared cache contention arising from the workload mix. Given that the load line is non-linear in the turbo range, allowing all cores to be at a highest level of turbo mode can unnecessarily consume power.

DETAILED DESCRIPTION

Figure 1:
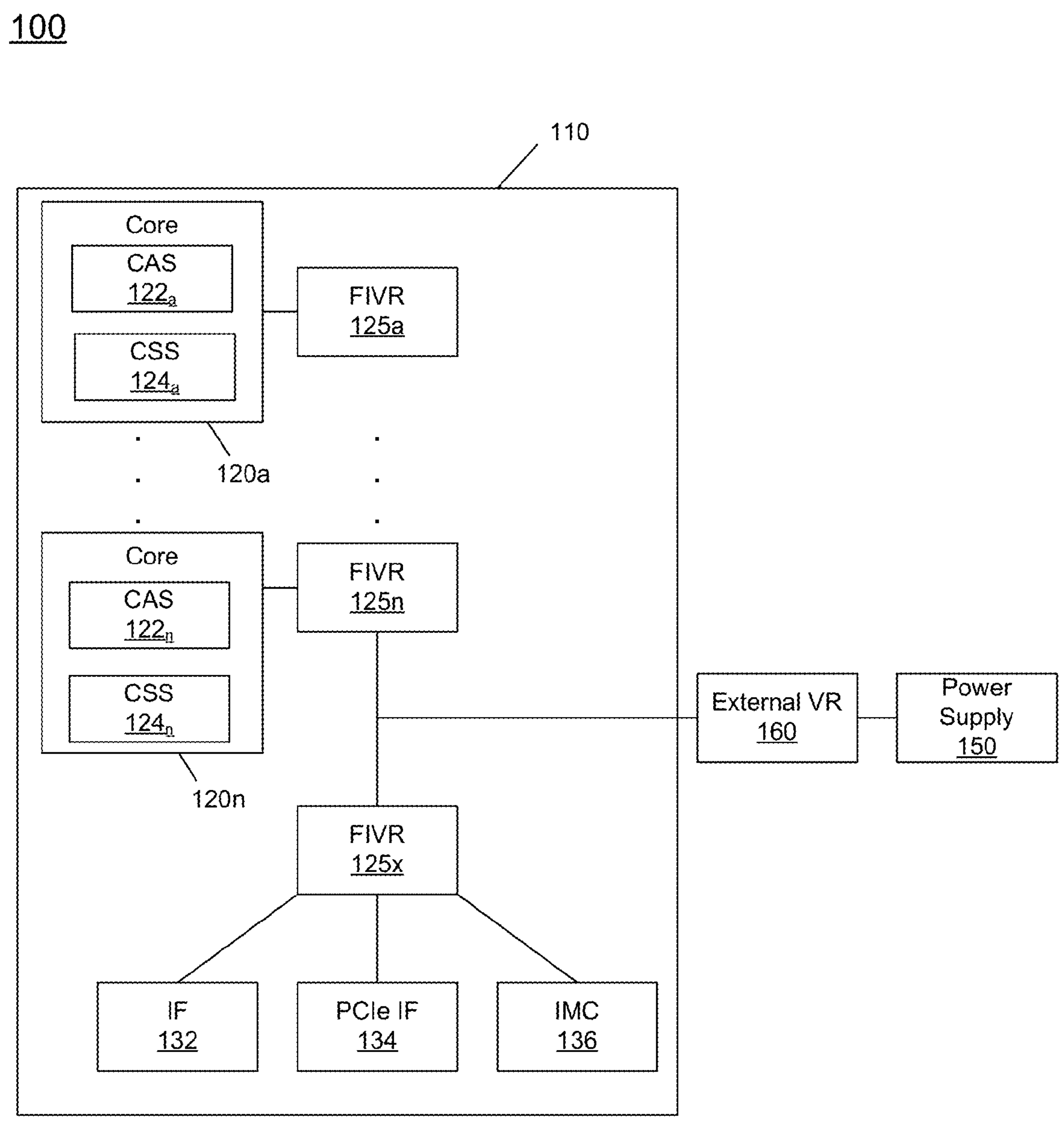
FIG. 1 is a block diagram of a system in accordance with one embodiment of the present invention.

Embodiments provide techniques to efficiently enable one or more cores to independently operate at a selected turbo mode frequency. Embodiments may be particularly suitable for a multicore processor in which each of multiple cores can operate at an independent voltage and frequency point. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine (referred to herein as a graphics domain) and one or more domains associated with non-core circuitry, referred to herein as an uncore or a system agent. Although many implementations of a multi-domain processor can be formed on a single semiconductor die, other implementations can be realized by a multi-chip package in which different domains can be present on different semiconductor die of a single package.

According to an OS-based ACPI mechanism, a processor can operate at various power and performance states or levels. With regard to power states, ACPI specifies different power consumption states, generally referred to as C1 to Cn states. When a core is active, it runs at a C0 state, and when the core is idle it may be placed in a core low power state, also called a core non-zero C-state (e.g., C1-C6 states). When all cores of a multicore processor are in a core low power state, the processor can be placed in a package low power state, such as a package C6 low power state.

In addition to these power states, a processor can further be configured to operate at one of multiple performance states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and thermal budget is available, processor hardware can configure the processor or at least portions thereof to operate at a higher than guaranteed frequency. In many implementations a processor can include multiple so-called bin frequencies, also referred to herein as turbo mode frequencies, above this P1 frequency. The highest such frequency may correspond to a maximum turbo frequency (P01), which is a highest frequency at which a domain can operate. This maximum turbo frequency thus is the highest end of multiple turbo mode frequencies greater than the P1 frequency and corresponds to a maximum non-guaranteed highest performance level that can be achieved. Note that the terms "performance state" or "P-state" can be interchangeably used with the term "operating frequency" (or more generally "frequency") as the frequency at which a core operates has a direct correlation to its performance. Thus as used herein a higher performance state correlates to a higher operating frequency.

As described herein, embodiments may provide a so-called energy efficient turbo (EET) algorithm that seeks to ramp a turbo-seeking core to a frequency at which its stalls for memory are tolerable, as determined by a configurable threshold, that is operating efficiently, power burned is proportional to performance obtained. The algorithm also takes into consideration any user/OS specified energy performance bias (EPB). In one embodiment, the EPB may be based on user input to an OS-based user preference menu to indicate a user's preference as to a power/performance tradeoff. With a performance bias, an application running on a core that is not stalled may be granted a maximum turbo frequency, but with an energy bias the core may have its frequency incremented by a unit step. Note that as used herein, a logic unit such as a core is stalled when all logical threads executing on the unit are waiting for memory loads/stores.

To effect an EET algorithm, embodiments may detect core stalls and core active cycles. In one embodiment, the cores themselves can be configured with one or more sensors, such as a core activity sensor and a core stall sensor. As will be described below, in an embodiment these sensors can be used to determine the proportion of cycles a core is stalled compared to the cycles it is active, termed core-centric unproductive time. This core-centric unproductive time can be meaningful and reliable regardless of the actual core and uncore interconnect operating frequencies, and thus serves well to classify a core as stalled or not using a single threshold. In various embodiments, this threshold may be configurable and can be a function of the system EPB.

The EET algorithm periodically analyzes all cores granted turbo mode to determine whether their frequency should be increased, decreased or left unchanged based on whether the core has been classified as stalled or not over the observation interval. Cores running applications that fit in their private cache over consecutive observation cycles (provided there exists power budget and no electrical, thermal or other constraints being violated) will reach the maximum turbo frequency. In scenarios where the workload mix changes and there is increasing cache contention, over time the turbo frequency of the affected cores will be reduced, e.g., steeply if the system is configured for energy bias or more slowly if configured with performance bias.

Embodiments may implement the EET algorithm in firmware such as firmware of a power control unit (PCU) of the processor. This algorithm may take as input hardware sensor data regarding core stalls and core active cycles and any user/operating system configured energy performance bias to adapt the core operating point.

A processor in accordance with one embodiment of the present invention may include a fully integrated voltage regulation (FIVR) such that per core P-states (PCPS) can be provided. In this way, cores can be operated at frequencies independently of each other. Thus embodiments combine this flexibility, information about core stall and active sensor data, and configured EPB to determine the operating point for a core in the turbo range to reap energy performance benefits.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $\mathbf{120}_a$-$\mathbf{120}_n$. In addition, each core may be associated with an individual voltage regulator $\mathbf{125}_a$-$\mathbf{125}_n$. Accordingly, a FIVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, each core can include various hardware sensors and other circuitry than can provide information for use in performing an EET algorithm in accordance with an embodiment of the present invention. More specifically as shown in FIG. 1, each core can include a core activity sensor 122 and a core stall sensor 124.

In one embodiment, core stall sensor 124 may be configured to determine a stall rate of a core which corresponds to a measure of waiting for stores/loads. This stall rate can be determined in various manners, ranging from a simple count of cycles for which the core is stalled to more complicated manners. Table 1 shows pseudo code for a core stall sensor in accordance with one embodiment of the present invention.

TABLE 1

```
If (all threads on core waiting for either a load/store) {
   If (wait > stall_wait_threshold) { // cache miss latency or any
      significant delay core_stall_count ++;
   }
}
```

In one embodiment, core activity sensor 122 may be configured to determine an activity rate of a core. This activity rate can be determined in various manners, ranging from a simple count of cycles for which the core is active to more complicated manners. In one embodiment, core activity sensor 122 can be configured to count cycles in which one or more threads on a core is in an active C0 state. Without loss of generality assume a physical core is associated with two logical processors or hardware threads, then the core has an active or C0 value that equals the time when one or more associated logical cores is active a C0 state during the observation window.

Still referring to FIG. 1, additional components may be present within the processor including an input/output interface 132, another interface 134, and an integrated memory controller 136. As seen, each of these components may be powered by another integrated voltage regulator $\mathbf{125}_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007). While not shown for ease of illustration, understand that additional components may be present within processor 110 such as uncore logic, a power control unit, and other components such as internal memories, e.g., one or more levels of a cache memory hierarchy and so forth. Furthermore, while shown in the implementation of FIG. 1 with an integrated voltage regulator, embodiments are not so limited.

Figure 2:
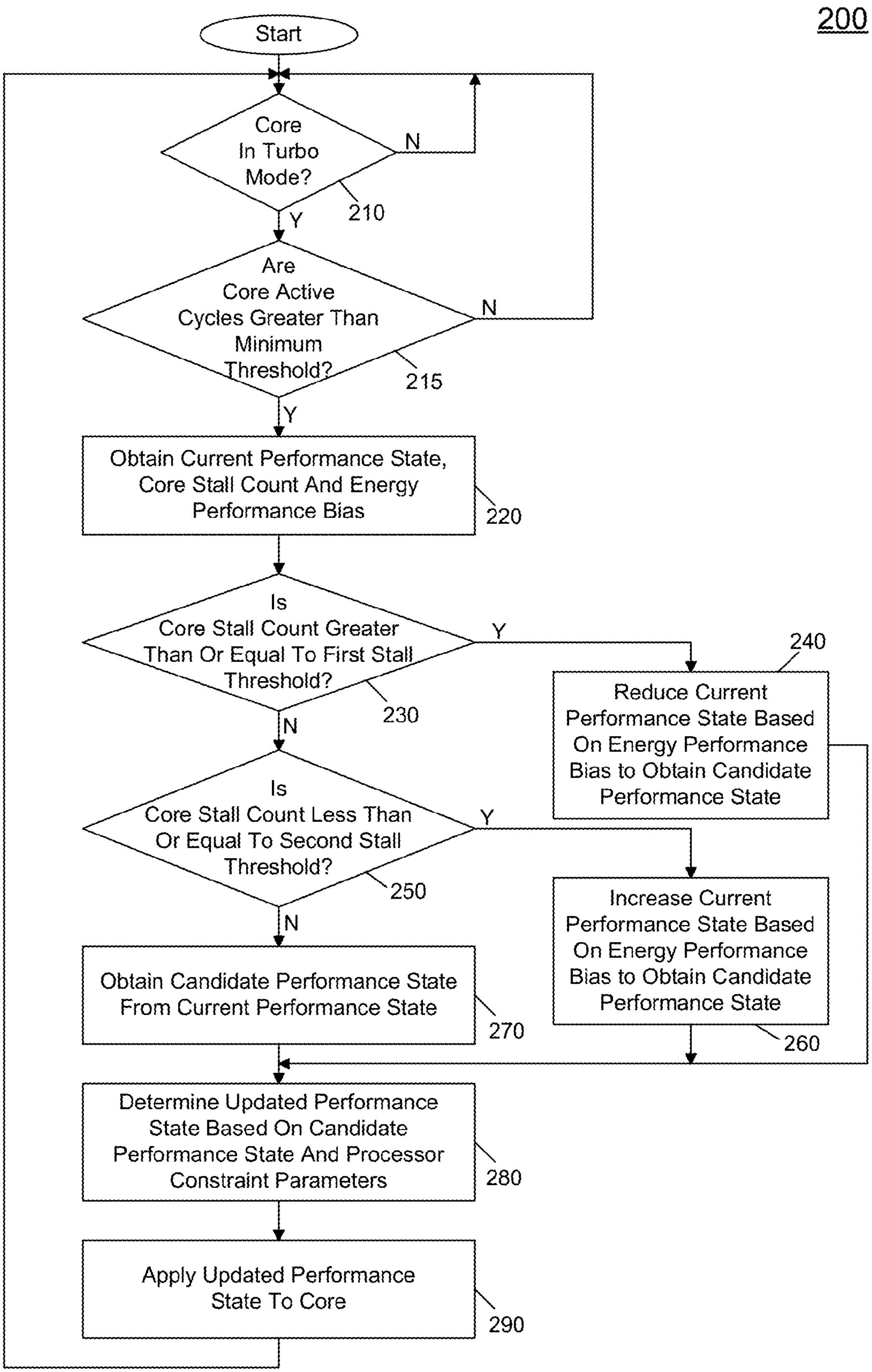
FIG. 2 is a flow diagram of a method in accordance with one embodiment of the present invention.

Referring now to FIG. 2, shown is a flow diagram of a method for performing energy efficient turbo analysis in accordance with an embodiment of the present invention. As seen in FIG. 2, method 200 may begin by determining whether a given core is in a turbo mode (diamond 210). Although the scope of the present invention is not limited in this regard, in one embodiment this determination may be made by logic such as a turbo mode control logic of a PCU. This determination may be based on whether a given core is currently in a turbo mode or has been granted permission to enter into a turbo mode. If the core is not granted turbo mode, the algorithm is not performed for that core and control immediately loops back on diamond 210.

Instead, for a turbo mode core, control passes to diamond 215 where it can be determined whether the number of core active cycles over the last observation interval is greater than a minimum threshold. Although the scope of the present invention is not limited in this regard, in one embodiment this number may be between approximately 20-40%. Thus if the core is sleeping for most of the time, it is not worth bumping up/down in turbo frequency. Power savings occur regardless because the core is power gated. Further, the core may lose its turbo status if it remains relatively inactive. As such, if the number of active cycles is below this threshold, this indicates that the core is either in a low power state or has performed very few operations. As such, the expense and time associated with making the determinations of the algorithm may not be worth the effort and thus no further analysis is performed for such core. Thus a core is considered active for purposes of analyzing the core under the EET algorithm if and only if it is above a minimum percentage number of cycles active as determined at the lowest core operating frequency running against an uncore interconnect operating at its lowest frequency. Using the lowest frequency enables use of a single threshold value that is meaningful across the range of operational frequencies of core and uncore.

Still referring to FIG. 2, control passes to block 220 where the current performance state of the core can be obtained, along with a core stall count and an energy performance bias value for the core. In some embodiments, all this information may be present in storages within the PCU such as a P-state mask that stores information regarding the current P-state of each core, a stall storage that stores core stall information from the cores, and an energy performance storage that stores an energy performance bias, which in one embodiment may be on a per core basis.

In one embodiment the algorithm may receive (or may calculate) a bias value that can be based on the energy performance bias, which may include individual bias values for each logical core associated with a physical core. In one embodiment, these bias values may be 4-bit values dynamically configured by the operating system. To obtain a bias value for use in the EET algorithm, a minimum of the bias values across all logical cores associated with physical core can be obtained, e.g., in accordance with Table 2 below.

TABLE 2

| |
|---|
| if (bias <= 3) → performance bias |
| else if (bias > 11) → energy bias |
| else → balance bias |

Still referring to FIG. 2, control passes to diamond 230 where it can be determined whether the core stall count is greater than or equal to a first stall threshold, also referred to herein as a deny threshold. This stall threshold may be set at a relatively high level to indicate that a relatively high number of stalls has occurred during the last observation interval. In some embodiments, this first stall threshold may be set between approximately 50% and 60%. If the core stall count is greater than or equal to this threshold, control passes to block 240 where the current performance state of the core may be reduced based on the energy performance bias to thus obtain a candidate performance state for this core. Note this candidate performance state may be at a level determined according to the EET algorithm, but it is not committed (if at all) to the core until the further operations of the algorithm of FIG. 2 are performed. Thus, the core may be controlled to operate at a decreased frequency from a current performance state if stalls exceed a stall deny threshold.

Figure 3:
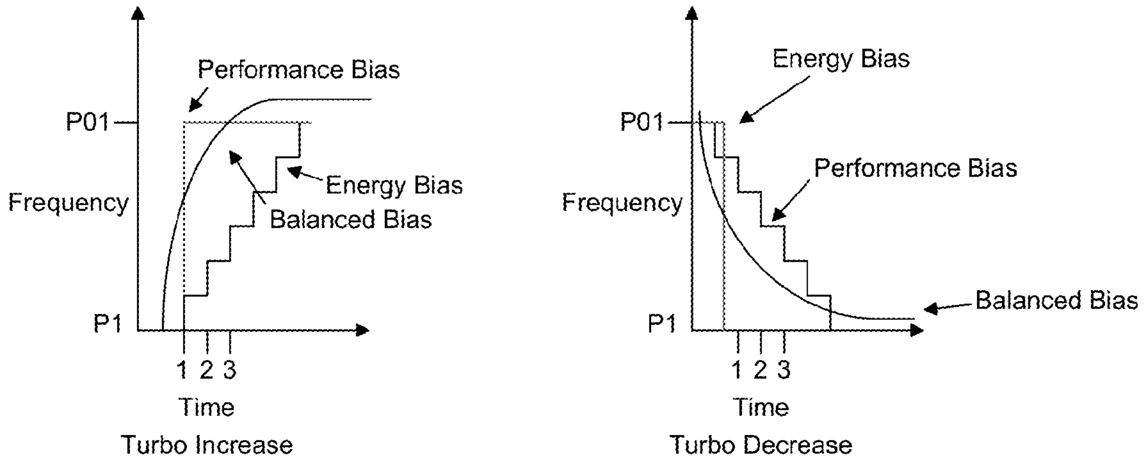
FIG. 3 is a graphical illustration of control of turbo mode incrementing and decrementing in accordance with an embodiment of the present invention.

Note that different amounts of reduction of the performance state can be determined based on the energy performance bias. That is, as shown in FIG. 3, which is a graphical illustration of control functions for increasing and decreasing operating frequency in accordance with one embodiment of the present invention, when a system is configured for performance, relatively small reductions in the performance state may be made. Instead, when a system is configured for energy savings, a relatively large change in performance state can occur. Of course a balanced policy which seeks to realize a balance between these two policies can provide an intermediate measure of reduction.

Still referring to FIG. 2, if instead at diamond 230 it is determined that the core stall count is not greater than or equal to this first stall threshold, control passes to diamond 250 where it can be determined whether the core stall count is less than or equal to a second stall threshold, also referred to herein as a stall grant threshold. This second stall threshold may be at a lower level, e.g., between approximately 10% and 20%. If so, this means that relatively few stalls are occurring on the core and thus the core is efficiently using its power consumption. Accordingly, control passes to block 260 where the current performance state can be increased based on the energy bias to obtain a candidate performance state. Thus in various embodiments, a core may be controlled to operate at an increased frequency from a current performance state if its stalls are less than a stall grant threshold.

As above with performance state decrements, these increments may be of a varying degree depending on the energy performance bias, as also seen in FIG. 3. Thus a greater performance state can be rapidly selected when a core is set for a performance bias and instead when a core is set for energy bias, a slower increase in the candidate performance state may occur.

Embodiments thus not only determine whether to increment/decrement/maintain core frequency but also by how much to modify the frequency. This is controlled by the energy performance bias configured by the user/operating system, in one embodiment. If the bias is performance, the frequency increase is more aggressive, whereas with an energy bias the frequency increase is more conservative. As seen in FIG. 3, with an energy bias, the increase is a one step up, where a step is any defined quantum, while in performance mode an increment change thus travels immediately (rockets) to the maximum possible frequency. In balanced mode the increase bridges the gap between the current operating point (current frequency) and the maximum possible frequency in a geometric manner. When decreasing a mirror image of this reasoning is applied, substituting maximum possible with minimum possible, as seen in FIG. 3.

Figure 4:
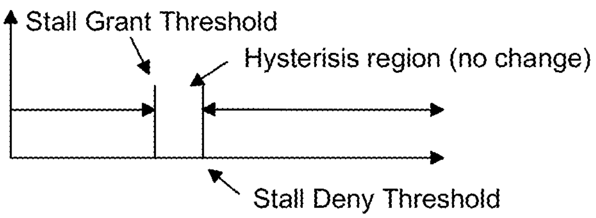
FIG. 4 is a graphical illustration of stall thresholds in accordance with one embodiment of the present invention.

As seen in FIG. 4, which is a graphical illustration of thresholds in accordance with one embodiment of the present invention, a first, high threshold may correspond to a stall deny threshold such that if greater than this threshold number of stalls (or stall rate) occurs during an observation interval, the core frequency can be reduced. Instead, when the number of stalls (or stall rate) occurring during an observation cycle is below a second, lower threshold, also referred to herein as a stall grant threshold, the core can be granted an increased frequency. In other conditions, namely when the number of stalls is between these two thresholds, which corresponds to a hysteresis range, no frequency update is to be performed.

Referring back to FIG. 2, if the current core stall count is not greater than or equal to this second stall threshold, control passes from diamond 250 to block 270 where the candidate performance state can be set equal to the current performance state.

From all of blocks 240, 260 and 270 control passes to block 280 where an updated performance state can be determined. More specifically, this updated performance state can be based on the candidate power state along with various constraints on the processor. Although the scope of the present invention is not limited in this regard, these constraints may include a thermal constraint, an electrical design point constraint, and a stock keeping unit (SKU)-based constraint, among others. In one embodiment, this determination can be realized by selecting the MIN of all the constraint-based performance states and the newly determined candidate performance state.

Then based on this determination, control passes to block 290 where the updated performance state can be applied to the given core. Note that if there is no performance state change, no communication may occur between the PCU and the core at this time. As seen, method 200 can be performed iteratively for each active core. Furthermore, this algorithm can be performed according to a given observation interval, which can be controllably selected, e.g., by firmware. Although shown at this high level in the embodiment of FIG. 2, understand the scope of the present invention is not limited in this regard.

Thus using the EET algorithm of FIG. 2, a power controller of a multicore processor can control operating frequencies in the turbo range of the cores independently. For example, the controller can prevent one core from executing at a requested turbo mode frequency if it has a stall rate greater than the stall deny threshold, while concurrently allowing a second core to execute at a requested turbo mode frequency if this core has a stall rate less than the stall grant threshold.

Also understand that an EET algorithm may have wide flexibility as it uses configurable values for thresholds and the periodicity with which it revisits turbo-granted cores. Further, the configuration can be a function of the energy performance bias specified. The arithmetic expression used to adapt the core frequencies can be a function of the core stalls. A function is reasonable as long as it meets the following caveats: core frequency monotonically rises under favorable stall conditions and monotonically falls under unfavorable stall conditions.

As to the thresholds, assume a customer with a computer system including a processor in accordance with an embodiment of the present invention and a given OS runs their own application and has their own power, performance and quality of service needs. These values will be a function of the EPB that the user/OS controls. In some embodiments, there may be a graphical user interface (e.g., dashboard) or other hooks to set these thresholds based on EPB. Note that each physical core may have an EPB corresponding to the minimum of its logical core EPBs. Referring now to Table 3 are example threshold values for different EPBs. Note that these values can be tuned post-silicon using benchmarks.

TABLE 3

| EPB Value | Active Threshold | Deny Threshold (first) | Grant Threshold (second) |
|---|---|---|---|
| Energy | 20 | 50 | 10 |
| Balanced | 20 | 50 | 10 |
| performance | 20 | 60 | 20 |

In some embodiments, a processor may provide predetermined values for performance, balanced and energy performance bias. In some embodiments, the second (grant) threshold may be less than the first (deny) threshold by 2 to 8 times or more. In one embodiment, these are real numbers, representing a fraction of observation window time.

Without loss of generality, Table 4 below is pseudocode of an implementation of an EET algorithm in accordance with one embodiment of the present invention.

TABLE 4

```
Every Revisit Period { // period configurable, about 1 millisecond
    P1 = MAXIMUM_GUARANTEED_RATIO; // SKU based constant
    MAXIMUM_TURBO; // SKU based constant
    GRANT_K // a low configurable constant 0 < GRANT_K < 1.0
    DENY_K // a high configurable constant; DENY_K > 2 *
    GRANT_K
            // 0 < DENY_K < 1.0
    for each core granted turbo {
      if (core_active_cycles >= min_activity_threshold) { ;
      // configurable
        //Demote or promote or no-change?
        curr_pstate ; // retrieve current pstate of core
        core_stall_cycles; // read sensor data from core
         bias ;// retrieve energy-perf bias of core
        if (core_stall_cycles >= core_active_cycles * DENY_K ) {
        // demote
            if (energy(bias)) { // energy bias
                new_Pstate = P1 ; // exit Turbo
            } else if (balance(bias)) {
                new_Pstate = ((P1 + curr_pstate)/2 ; // less Turbo
            } else { // performance bias, a little less turbo
                new_Pstate = maximum(curr_pstate - 1, P1)
```

TABLE 4-continued

```
        }
    } else if (core_stall_cycles >= core_active_cycles *
    GRANT_K )
        { // promote .. further
        if (energy(bias)) { ; // slow increase
            new_Pstate = min (P1 + 1, MAXIMUM_TURBO)
    } else if (balanced(bias)) { ; // faster increase
            new_Pstate = (MAXIMUM_TURBO +
            curr_pstate)/2
    } else { // performance bias, shoot up to maximum turbo
            new_Pstate = MAXIMUM_TURBO;
        }
    } // else in hysterisis region, no change
    // apply all constraints
    new_pstate = min(new_pstate,
                min(Electrical design point, Thermal, SKU, other
limits));
  } // if_active
} // for-each loop
```

Note in Table 4 that after determination of a candidate performance state (new_pstate), a minimum function is applied, which includes electrical design point considerations, which is applied last because it depends on the number of cores seeking to turbo and their degree of turbo. Another parameter of the minimum function is a thermal constraint, as past activity and environment affects processor temperature and thus how much the cores may turbo consequently without melt down.

Figure 5:
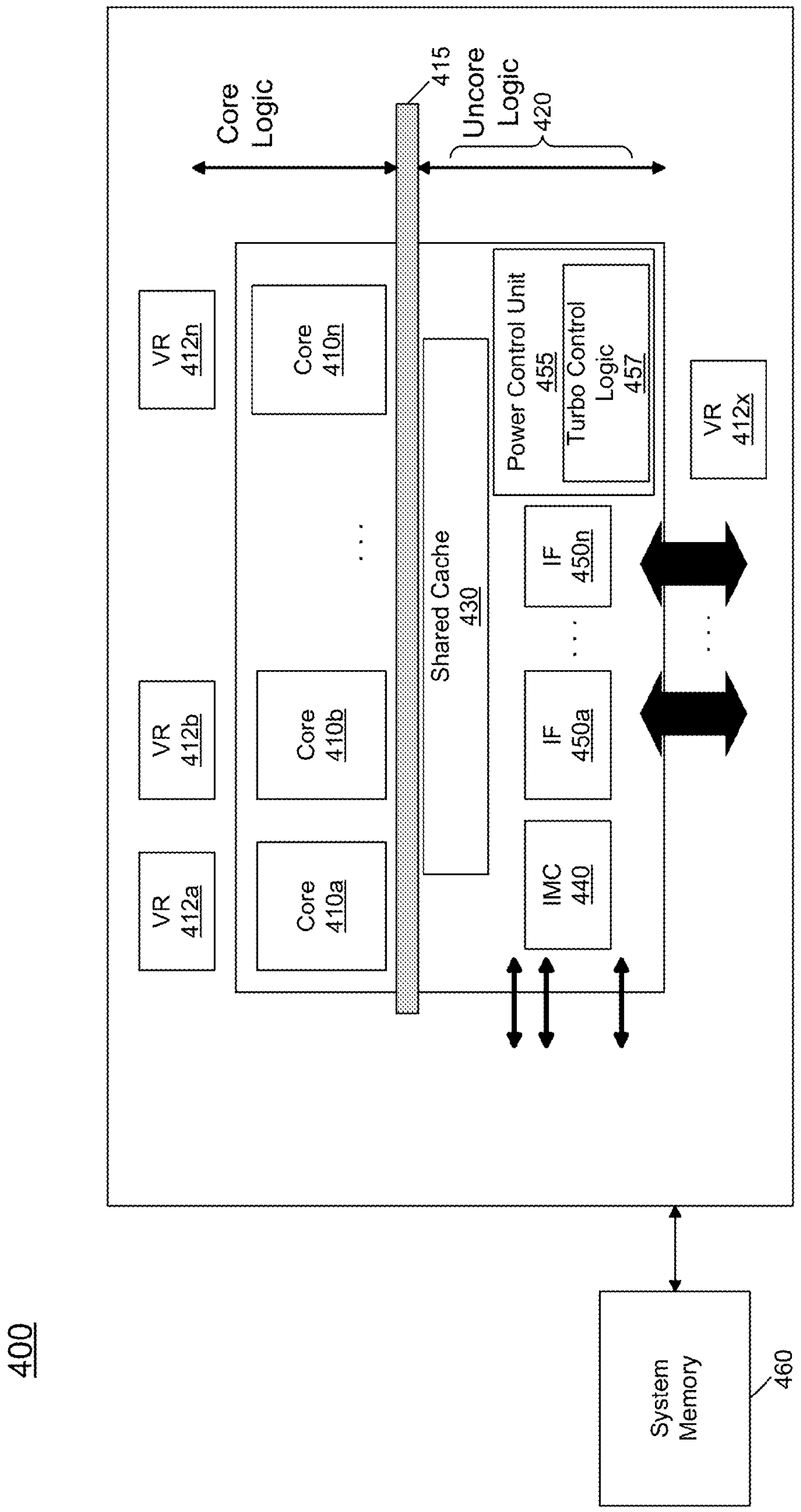
FIG. 5 is a block diagram of a processor in accordance with an embodiment of the present invention.

Referring now to FIG. 5, shown is a block diagram of a processor in accordance with an embodiment of the present invention. As shown in FIG. 5, processor 400 may be a multicore processor including a plurality of cores $\mathbf{410}_a$-$\mathbf{410}_n$. In one embodiment, each such core may be configured to operate at multiple voltages and/or frequencies. In addition, each core may be independently controlled to operate at a selected voltage and/or frequency, as discussed above. To this end, each core may be associated with a corresponding voltage regulator 412*a*-412*n*. While not shown for ease of illustration, understand that each core 410 can include a core activity sensor and a core stall sensor. The various cores may be coupled via an interconnect 415 to an uncore or system agent logic 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may be in communication with OS power management code, effected by the OS writing to a machine specific register (MSR), one per logical processor. For example, based on a request received from the OS and information regarding the workloads being processed by the cores, power control unit 455 may use included turbo control logic 457 that in one embodiment may execute firmware to realize the algorithm set forth in FIG. 2. In this way turbo control logic 457 can determine an appropriate combination of voltage and frequency for operating each of the cores in turbo mode including controlling a turbo frequency for cores in a turbo mode based on core activity level. Note that non-turbo cores may operate at an OS-selected P-state. Based on the above-described information, power control unit 455 can dynamically and independently control a frequency and/or voltage to one or more cores in light of the core's activity levels.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
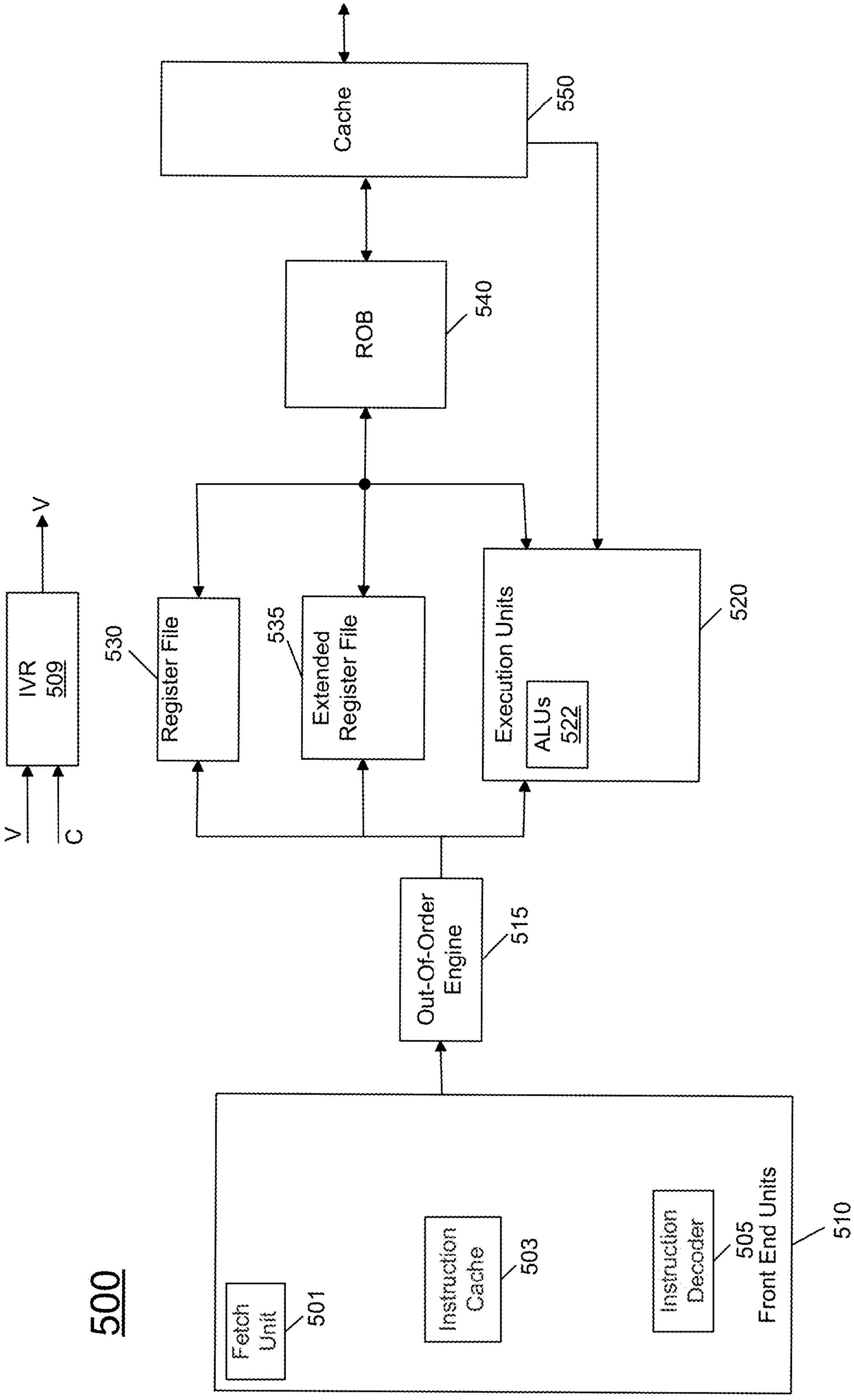
FIG. 6 is a block diagram of a processor core in accordance with an embodiment of the present invention.

Referring now to FIG. 6, shown is a block diagram of a processor core in accordance with one embodiment of the present invention. As shown in FIG. 6, processor core 500 may be a multi-stage pipelined out-of-order processor. As shown in FIG. 6, core 500 may operate at various voltages and frequencies as a result of integrated voltage regulator 509. In various embodiments, this regulator may receive an incoming voltage signal, e.g., from an external voltage regulator and may further receive one or more control signals, e.g., from uncore logic coupled to core 500.

As seen in FIG. 6, core 500 includes front end units 510, which may be used to fetch instructions to be executed and prepare them for use later in the processor. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 6, ROB 540 is coupled to a cache 550 which in one embodiment may be a low level cache (e.g., an L1 cache), although the scope of the present invention is not limited in this regard. Also, execution units 520 can be directly coupled to cache 550. From cache 550, data communication may occur with higher level caches, system memory and so forth. While shown with this high level in the embodiment of FIG. 6, understand the scope of the present invention is not limited in this regard. For example, while the implementation of FIG. 6 is with regard to an out-of-order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 7:
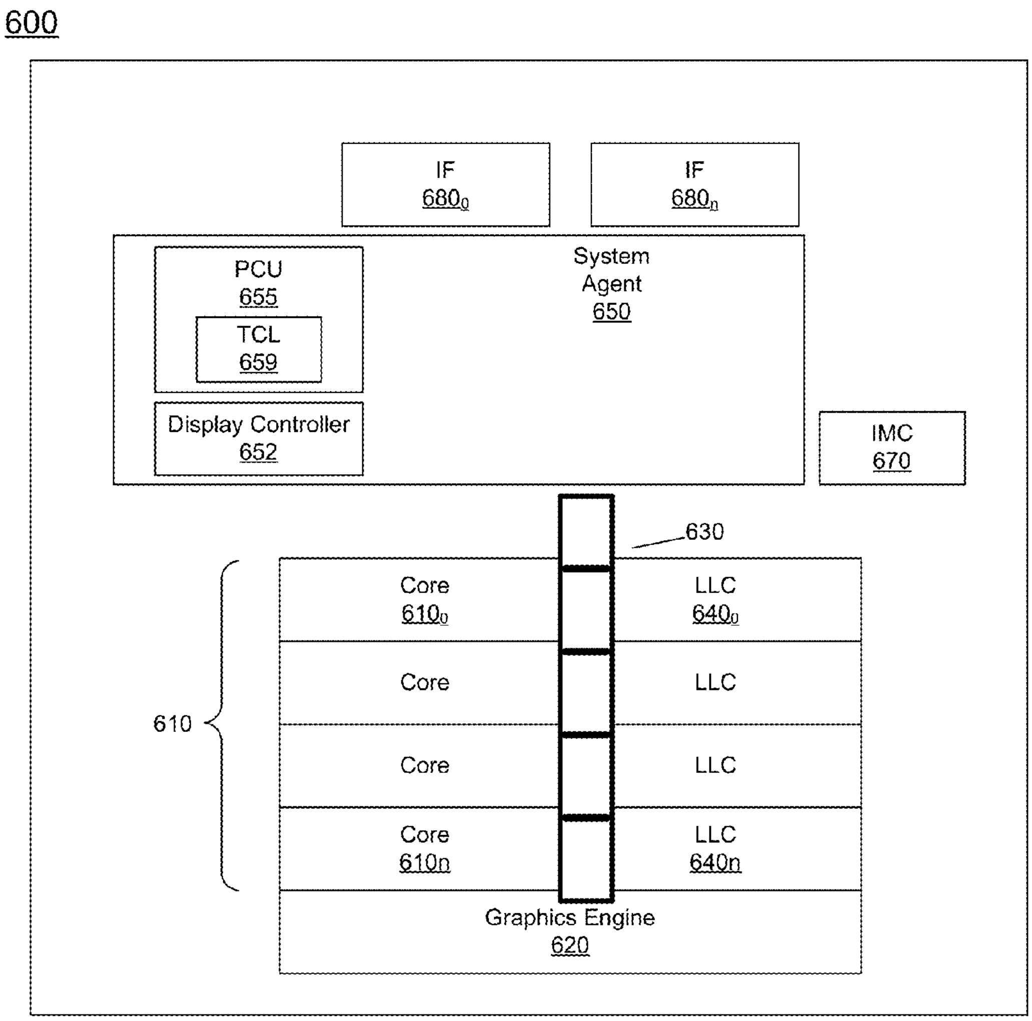
FIG. 7 is a block diagram of a processor in accordance with another embodiment of the present invention.

Referring now to FIG. 7, shown is a block diagram of a multicore processor in accordance with another embodiment of the present invention. As shown in the embodiment of FIG. 7, processor 600 includes multiple domains. Specifically, a core domain 610 can include a plurality of cores $\mathbf{610}_0$-$\mathbf{610}n$, a graphics domain 620 can include one or more graphics engines, and a system agent domain 650 may further be present. In various embodiments, system agent domain 650 may handle power control events and power management such that individual units of domains 610 and 620 such as cores and/or graphics engines can be controlled to independently dynamically operate at an appropriate turbo mode frequency in light of the activity (or inactivity) occurring in the given unit. Each of domains 610 and 620 may operate at different voltage and/or power, and furthermore the individual units within the domains each may operate at an independent frequency and voltage. Note that while only shown with three domains, understand the scope of the present invention is not limited in this regard and additional domains can be present in other embodiments.

In general, each core 610 may further include low level caches in addition to various execution units and additional processing elements. In turn, the various cores may be coupled to each other and to a shared cache memory formed of a plurality of units of a LLC $\mathbf{640}_0$-$\mathbf{640}_n$. In various embodiments, LLC 640 may be shared amongst the cores and the graphics engine, as well as various media processing circuitry. As seen, a ring interconnect 630 thus couples the cores together, and provides interconnection between the cores, graphics domain 620 and system agent circuitry 650. In one embodiment, interconnect 630 can be part of the core domain. However in other embodiments the ring interconnect can be of its own domain.

As further seen, system agent domain 650 may include display controller 652 which may provide control of and an interface to an associated display. As further seen, system agent domain 650 may include a power control unit 655 which can include a turbo control logic 659 in accordance with an embodiment of the present invention to control a turbo mode frequency of the cores individually based on activity information of the corresponding core. In various embodiments, this logic may execute the algorithm described above in FIG. 2.

As further seen in FIG. 7, processor 600 can further include an integrated memory controller (IMC) 670 that can provide for an interface to a system memory, such as a dynamic random access memory (DRAM). Multiple interfaces $\mathbf{680}_0$-$\mathbf{680}_n$ may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 8:
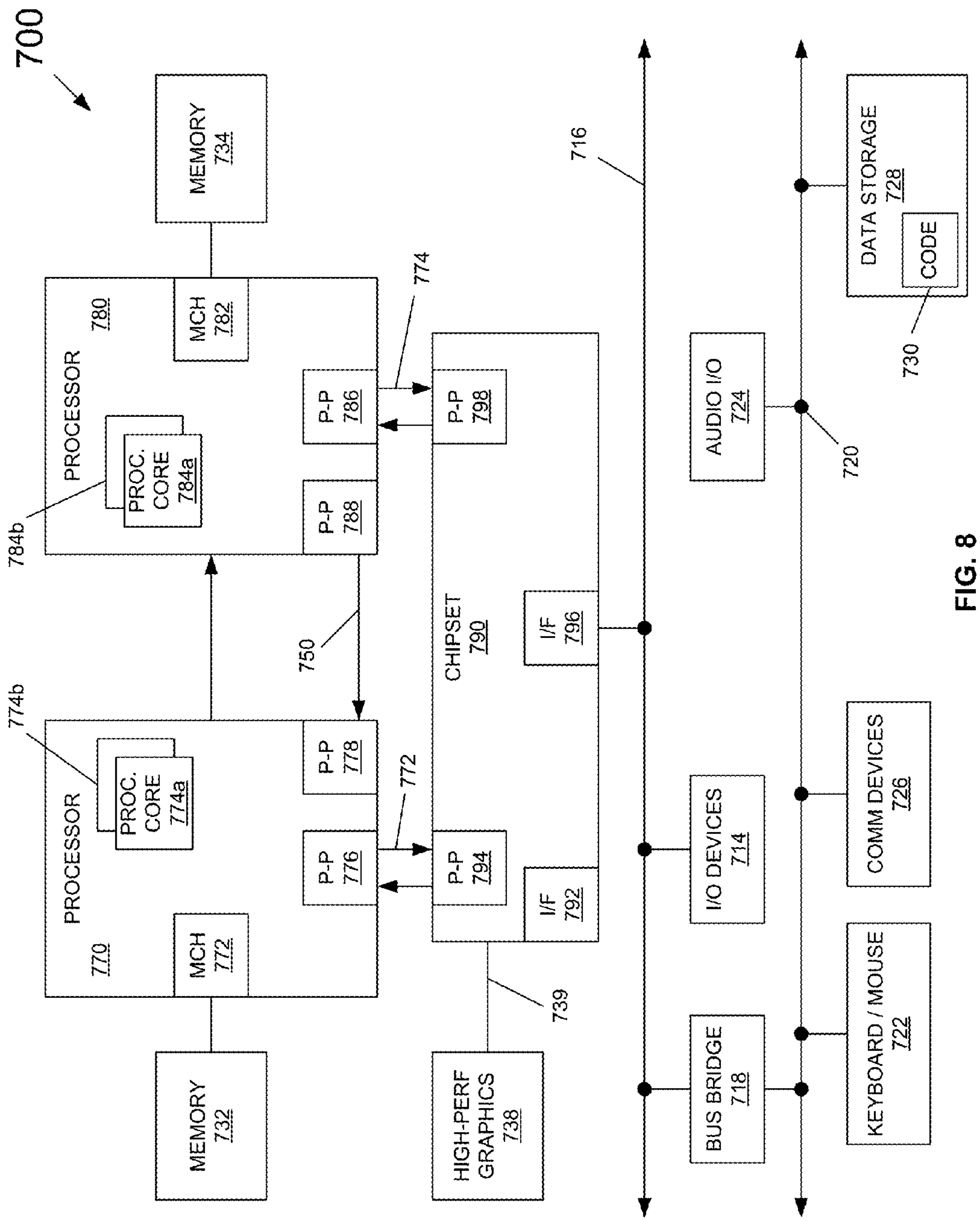
FIG. 8 is a block diagram of a system in accordance with one embodiment of the present invention.

Embodiments may be implemented in many different system types. Referring now to FIG. 8, shown is a block diagram of a system in accordance with an embodiment of the present invention. As shown in FIG. 8, multiprocessor system 700 is a point-to-point interconnect system, and includes a first processor 770 and a second processor 780 coupled via a point-to-point interconnect 750. As shown in FIG. 8, each of processors 770 and 780 may be multicore processors, including first and second processor cores (i.e., processor cores 774*a* and 774*b* and processor cores 784*a* and 784*b*), although potentially many more cores may be present in the processors. Each of the processors can include a PCU or other logic to perform dynamic control of a permitted operating frequency greater than a guaranteed operating frequency based on core activity occurring to efficiently consume energy, as described herein.

Still referring to FIG. 8, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 8, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 752 and 754, respectively. As shown in FIG. 8, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 8, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, ultrabook, or so forth.

Embodiments thus enable distributing power more effectively in the turbo range on a per core basis. This is particularly so as in the turbo range power is non-linear, and a better power performance foot print may be achieved using considered operating point selection. Embodiments may also provide for scalability, as it can be used with increasing core counts and increasing number of threads per core. As such a processor in accordance with an embodiment of the present invention may more effectively use its turbo budget, preferentially allocating it to cores that can make more effective use of it as opposed to others that cannot, and thus facilitating greater single threaded performance.

Embodiments also seek to run a core at a frequency deemed useful for the application running on the core based on core stall count metrics. A frequency adapter in accordance with an embodiment of the present invention may receive as one of its parameters user/operating system specified energy performance bias on each active thread, enabling customized behavior for data centers and high performance needs, thus improving overall product energy performance metrics.

According to one aspect, the present invention includes a system with a processor including multiple cores and voltage regulators each to independently provide a voltage to at least one of the cores, along with a memory such as a dynamic random access memory (DRAM) coupled to the processor. Either included in the processor or coupled thereto may be a PCU to control the voltage regulators to provide independent voltages to at least some of the cores. In addition, the PCU may include means for controlling the core frequencies independently. In one such embodiment, this means can be implemented as a turbo mode control logic. In addition the means can further enable a given core to operate at an increased turbo mode frequency if a core stall metric of the core at a current turbo mode frequency (that is below the increased turbo mode frequency) is less than a stall threshold.

In addition, this PCU logic can further perform various methods to efficiently control turbo mode of the processor. As an example, the method can include obtaining a current performance state of a core, a core stall count of the core during an observation interval, and an energy performance bias for the core, then determining if the core stall count is at least equal to a stall threshold and if so, reducing the current performance state of the core based on the energy performance bias to obtain a candidate performance state. From this information, an updated performance state can be determined and applied to the core.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:

a plurality of cores to independently execute instructions; and a power controller to control a frequency at which the processor is to operate, the power controller including first logic to prevent a first core of the plurality of cores from execution at a requested turbo mode frequency if the first core has a stall rate greater than a first stall threshold, the stall rate of the first core corresponding to a rate at which the first core has waited for memory loads/stores, and concurrently allow a second core of the plurality of cores to execute at a requested turbo mode frequency if the second core has a stall rate less than a second stall threshold, wherein the first logic is to generate a candidate performance state at a first lower frequency if an energy performance bias value is at an energy bias and at a second lower frequency if the energy performance bias value is at a performance bias, the second lower frequency greater than the first lower frequency.

2. The processor of claim 1, wherein the first logic is to reduce a current performance state for the first core based on the energy performance bias value to generate the candidate performance state if the stall rate of the first core is greater than the first stall threshold.

3. The processor of claim 2, wherein the first logic is to determine an updated performance state for the first core based on the candidate performance state and a plurality of constraints on the processor.

4. The processor of claim 3, wherein the first logic is to apply the updated performance state to the first core.

5. The processor of claim 2, wherein the first logic is to increase a current performance state for the second core based on the energy performance bias value to generate the candidate performance state if the stall rate of the second core is less than the second stall threshold.

6. The processor of claim 1, wherein the first logic is to maintain a current turbo mode frequency of the first core if the stall rate of the first core is between the first and second stall thresholds.

7. A method comprising: obtaining a current performance state of a first core of a multicore processor, a core stall count of the first core during a first observation interval corresponding to cycles in which the first core was waiting for memory loads/stores, and an energy performance bias for the first core; determining if the core stall count is at least equal to a first stall threshold;

if so, reducing the current performance state of the first core based on the energy performance bias to obtain a candidate performance state; and determining if core active cycles of the first core during the first observation interval are less than a minimum threshold, and if so maintaining the current performance state of the first core for a next observation interval without further analysis.

8. The method of claim 7, further comprising determining an updated performance state based on the candidate performance state and a plurality of processor constraint parameters.

9. The method of claim 8, further comprising applying the updated performance state to the first core.

10. The method of claim 7, further comprising determining if the current performance state of the first core is not in or not granted turbo mode, and if so maintaining the current performance state of the first core for a next observation interval without further analysis.

11. The method of claim 7, further comprising if the core stall count is not at least equal to the first stall threshold, determining if the core stall count is less than or equal to a second stall threshold, and if so increasing the current performance state of the first core based on the energy performance bias to obtain the candidate performance state.

12. The method of claim 11, further comprising if the core stall count is between the first and second stall thresholds, obtaining the candidate performance state from the current performance state of the first core.

13. A system comprising: a processor including a plurality of cores, a plurality of integrated voltage regulators each to independently provide a voltage to at least one of the plurality of cores, and a power control unit (PCU) to control the plurality of integrated voltage regulators to provide independent voltages to at least some of the plurality of cores, the PCU comprising a turbo mode control logic to control a frequency of the plurality of cores independently and to enable a first core of the plurality of cores to operate at an increased turbo mode frequency if a core stall metric of the first core at a current turbo mode frequency below the increased turbo mode frequency is less than a second stall threshold, wherein the turbo mode control logic is to enable a second core of the plurality of cores to operate at a reduced turbo mode frequency if a core stall metric of the second core at a current turbo mode frequency above the reduced turbo mode frequency is at least equal to a first stall threshold, wherein the first stall threshold is greater than the second stall threshold; and a dynamic random access memory (DRAM) coupled to the processor.

14. The system of claim 13, wherein the PCU is to receive the core stall metric of the first core from a stall sensor of the first core.

15. The system of claim 13, wherein the turbo mode control logic is to increase a turbo mode frequency of the first core at a faster rate when the processor is in a performance mode than when the processor is in an energy mode.

16. The system of claim 15, wherein the turbo mode control logic is to decrease the turbo mode frequency of the first core at a faster rate when the processor is in the energy mode than when the processor is in the performance mode.

17. The system of claim 13, wherein the turbo mode control logic is to determine an updated performance state using a candidate performance state based on the core stall metric and a plurality of processor constraint parameters, and apply the updated performance state to the first core.

* * * * *